United States Patent [19]

Lew et al.

[11] Patent Number: 4,574,644
[45] Date of Patent: Mar. 11, 1986

[54] BALL BEARING FLOW METER AND PUMP

[76] Inventors: Hyok S. Lew, 7890 Oak St., Arvada, Colo. 80005; Michael Stranahan, P.O. Box 15, Woody Creek, Colo. 81656

[21] Appl. No.: 617,375

[22] Filed: Jun. 4, 1984

[51] Int. Cl.⁴ .................. G01F 3/00; F04B 17/00; F04B 19/00
[52] U.S. Cl. .................. 73/861.05; 73/255; 417/320; 417/410
[58] Field of Search .................. 73/861.05, 255; 417/410, 420, 320

[56] References Cited

U.S. PATENT DOCUMENTS

| 2,875,695 | 3/1959 | Justice | 417/410 |
| 3,496,871 | 2/1970 | Stengel | 417/410 |
| 4,321,020 | 3/1982 | Mittal | 417/410 |

Primary Examiner—Herbert Goldstein

[57] ABSTRACT

This invention relates to a positive displacement flow meter or pump comprising a plurality of spherical balls orbitably entrained in a toroidal cavity. The first segment of the toroidal cavity tangentially connecting a fluid inlet to a fluid outlet comprises the flow passage for the fluid being measured or pumped and the second segment provides the return pass for the spherical balls. A rotating magnetic field about the line of axisymmetry of the toroidal cavity generates the orbiting movement of the spherical balls for measuring the flow rate or for pumping.

8 Claims, 20 Drawing Figures

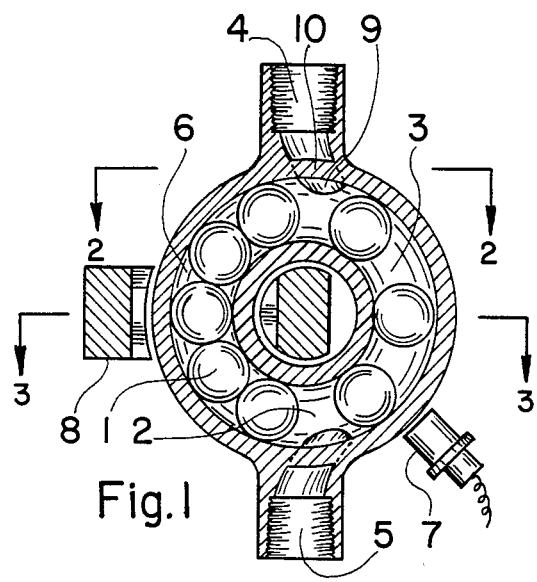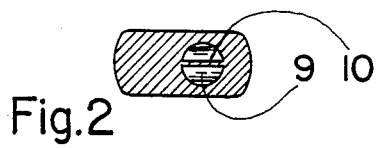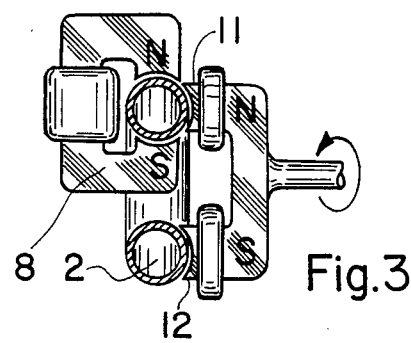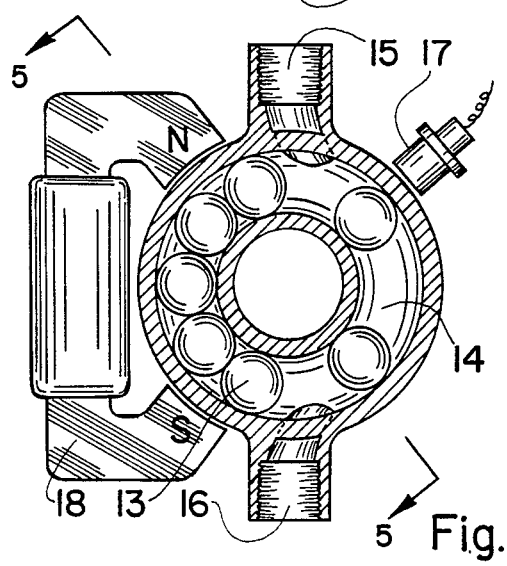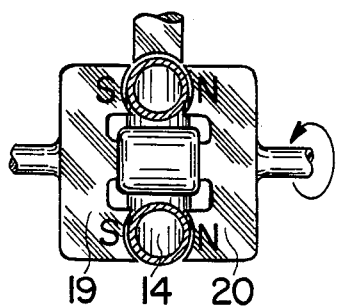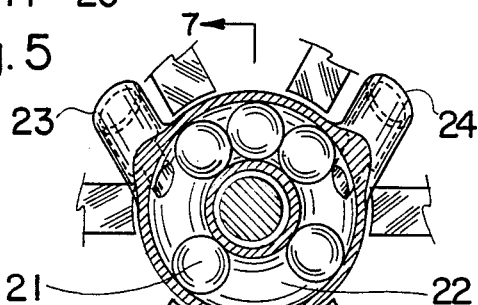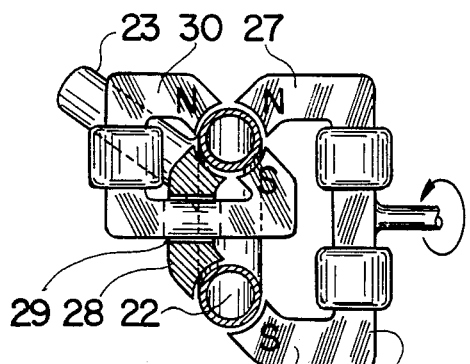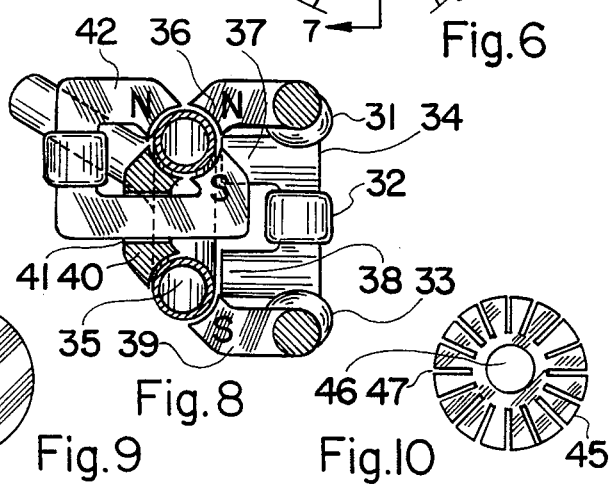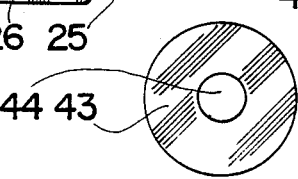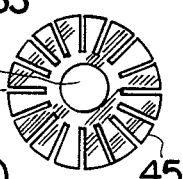

BALL BEARING FLOW METER AND PUMP

BACKGROUND OF THE INVENTION

As the present-day chemical and pharaceutical industries become ever-increasingly automated, there is a great demand of means for acccurately measuring the flow rate or the total amount of flow over a given time period. The most desirable type of flow meter is the positive displacement flow meter, which provides a means for measuring a flow with high accuracy and reliability. Few positive displacement flow meters are commercially available today and positive displacement flow meter technology is virtually nonexistent at the present time.

The primary object of the present invention is to provide a positive displacement flow meter comprising a train of spherical balls orbitably entrained in a toroidal cavity wherein a magnetic field rotating about the axis of axisymmetry of the toroidal cavity and the fluid flow jointly generates the orbiting movement of the spherical balls.

Another object is to provide a positive displacement pump including a train of spherical balls orbitably entrained in a toroidal cavity wherein a rotating magnetic field generates the orbiting movement of the spherical balls in the first segment of the toroidal cavity comprising the flow passage and a stationary magnetic field produces a braking on the orbiting movement of the spherical balls in the second segment of the toroidal cavity.

A further object is to provide a positive displacement flow meter or a positive displacement pump including the guides across the inlet and outlet openings into the toroidal cavity that enhances a continuous and smooth orbiting movement of the spherical balls.

Yet another object is to provide a positive displacement flow meter that functions as a flow meter as well as a flow controlling device.

Yet a further object of the present invention is to provide a positive displacement pump which requires no seals.

Still another object is to provide a positive displacement flow meter or a positive displacement pump with a simple and a compact construction.

Still a further object is to provide a positive displacement flow meter or a positive displacement pump which is inexpensive.

These and other objects of the present invention will become clear as the description thereof proceeds.

BRIEF DESCRIPTION OF FIGURES

The present invention may be described with great clarity and specificity by referring to the following Figures:

FIG. 1 illustrates a cross section of a ball bearing pump constructed in accordance with the principles of the present invention.

FIG. 2 illustrates another cross section of the ball bearing pump of FIG. 1 taken along a plane 2—2 as shown in FIG. 1.

FIG. 3 illustrates a further cross section of the ball bearing pump of FIG. 1 taken along a plane 3—3 as shown in FIG. 1.

FIG. 4 illustrates a cross section of another embodiment of the ball bearing pump.

FIG. 5 illustrates another cross section of the ball bearing pump of FIG. 4 taken along a plane 5—5 as shown in FIG. 4.

FIG. 6 illustrates a cross section of a further embodiment of the ball bearing pump.

FIG. 7 illustrates another cross section of the ball bearing pump of FIG. 6 employing the rotating magnets in creating a rotating magnetic field, which cross section is taken along a plane 7—7 as shown in FIG. 6.

FIG. 8 illustrates a cross section of the ball bearing pump of FIG. 6 employing the stationary magnets in creating a rotating magnetic field, which cross section is taken along the same plane as that of FIG. 7.

FIG. 9 illustrates an end view of a magnetic core usable in conjunction with the arrangement shown in FIG. 7 or in FIG. 8.

FIG. 10 illustrates an end view of another magnetic core usable in conjunction with the arrangement shown in FIG. 7 or in FIG. 8.

SPECIFICATION

Figure 11:
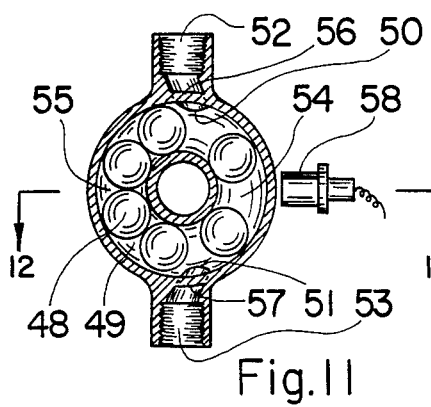
FIG. 11 illustrates a cross section of a ball bearing flow meter constructed in accordance with the principles of the present invention.

In FIG. 1, there is shown a cross section of a ball bearing pump taken along a plane including the center line of the toroidal cavity or the closed loop cavity. A plurality of the spherical balls 1 are orbitably entrained in series within a toroidal cavity or a closed loop cavity 2. The cross section of the toroidal cavity 2 is a circle with a diameter slightly larger than the diameter of the spherical balls 1; whereby, only little amounts of fluid can leak across each of the spherical balls 1 while each of the spherical balls 1 is allowed to orbit following the toroidal cavity 2. The toroidal cavity 2 is divided into two segments; the first segment 3 connecting the first port 4 and the second port 5 tangentially providing a fluid passage from one port to the other port, and the second segment 6 providing a return pass for the spherical balls 1. A sensor 7 sensing each of the spherical balls passing by is installed adjacent to the outer wall of the toroidal cavity 2 on the first segment side. A stationary magnet 8 providing braking on the orbiting spherical balls 1 is installed on the second segment side.

In FIG. 2, there is shown another cross section of the ball bearing pump of FIG. 1 taken along a plane 2—2 as shown in FIG. 1. The opening 9 of the port 4 into the toroidal cavity 2 is provided with a guide 10 having a guiding edge commensurate with the outer perimeter of the toroidal cavity, that enhances the orbiting movement of the spherical balls. The opening of the port 5 into the toroidal cavity also includes such a guide.

In FIG. 3, there is shown a further cross section of the ball bearing pump of FIG. 1 taken along a plane 3—3 as shown in FIG. 1. The toroidal cavity 2 is coaxially disposed adjacent to rotating magnets 11, 12, etc., which creates a rotating magnetic field wherein the flux lines of the rotating magnetic field traverse across the toroidal cavity. The rotating magnetic field creates the orbiting movement of the spherical balls by induction, reluctance or hysteresis. The spherical balls may be made of solid or hollow stainless steel or carbon steel, copper, aluminum with plastic lining depending on the type of magnetic orbiting. The spherical balls may be stainless steel or plastic balls with a permanent magnetic bar or carbon steel bar embeded inside of the spherical balls. The stationary magnetic field across the toroidal cavity created by the stationary magnet 8 disposed at the second segment of the toroidal cavity, puts a braking effect on the orbiting motion of the spherical balls driven by the rotating magnetic field created by the rotating magnets 11, 12, etc.

With the arrangement as shown in FIGS. 1 and 2, the spherical balls experience acceleration in the vicinity of one of two port openings into the toroidal cavity and experiences deceleration in the vicinity of the other of two port openings depending on the direction of the orbiting motion of the spherical balls. When the spherical balls are accelerated in the vicinity of the first port 4, the distance between two adjacent spherical balls increases and, consequently, the fluid is drawn into the first segment 3 of the toroidal cavity 2 from the port 4. When the spherical balls are decelerated in the vicinity of the second port 5, the distance between two adjacent spherical balls decreases and, consquently, the fluid is forced out from the first segment 3 of the toroidal cavity 2 into the second port 5. Since there is only a little amount of fluid leaking across each of the spherical balls, the fluid has to move with the orbiting spherical balls and, consequently the ball bearing pump shown in FIGS. 1 and 2 functions as a positive displacement pump. The pumping rate can be obtained by counting the frequency of the spherical balls passing by the sensor 7 and calibrating such information into an actual volume flow rate or mass flow rate.

In FIG. 4, there is illustrated a cross section of another embodiment of the ball bearing pump comprising a plurality of spherical balls 13, a toroidal cavity 14, a pair of ports 15 and 16, and a ball counter 17 arranged in the same manner as that of the combination shown in FIG. 1. The stationary braking magnet 18 is disposed at the return-pass side of the toroidal cavity adjacent to the outer wall of the toroidal cavity on a plane including the center line of the toroidal cavity, which arrangement allows a sandwiching of the toroidal cavity 14 with a pair of rotating magnet as shown in FIG. 5.

In FIG. 5, there is shown another cross section of the ball bearing pump of FIG. 4 taken along a plane 5—5 as shown in FIG. 4. A pair of rotating magnets with multiple poles 19 and 20 sandwiches the toroidal cavity 14 in a coaxial relationship, which arrangement generates a strong rotating magnetic field with fluxes traversing across the toroidal cavity 14.

In FIG. 6, there is illustrated a cross section of a further embodiment of the ball bearing flow meter including the spherical balls 21, a toroidal cavity 22 and a pair of ports 23 and 24. The ports 23 and 24 are connected to the toroidal cavity 22 in a 45 degree angle with respect to the plane including the center line of the toroidal cavity.

In FIG. 7, there is shown another cross section of the ball bearing pump of FIG. 6 taken along a plane 7—7 as shown in FIG. 6. The rotating magnet 25 with multiple poles are rotatably disposed adjacent to the toroidal cavity 22. The poles 26, 27, etc., of the rotating magnet 25 are disposed in the first quadrant of the cross section of the toroidal cavity. The central core 28 with a centrally located circular hole 29 has its rim extending towards to the toroidal cavity 22 in the third quadrant of the cross section of the toroidal cavity. The poles of the braking magnet 30 installed on the return-pass side of the toroidal cavity occupies the second and fourth quadrant of the cross section of the toroidal cavity wherein the C-shaped core of the braking magnet extends through the hole 29 centrally disposed through the central core 28. The port 23 and 24 extends out from the toroidal cavity 22 in the second quadrant of the cross section of the toroidal cavity. The central core 28 may be arranged to rotate with the rotating magnet 25 or to be stationary.

In FIG. 8, there is illustrated a cross section of yet another embodiment of the ball bearing pump similar to that shown in FIG. 6, which cross section is taken along the same plane as that of FIG. 7. In this arrangement, the rotating magnetic filed is created by a series of electric coils 31, 32, 33, etc., wound around a stationary annular core 34 placed adjacent to the toroidal cavity in a coaxial relationship. A plurality of the poles 36, 37, 38, 39, etc., extending from the annular core 34 disposed in the same manner as the multiple poles of the rotating magnet 25 of FIG. 7 generate rotating magnetic flux traversing across the toroidal cavity and connecting into the central core 40 with a centrally located hole 41. The braking magnet 42 installed on the return-pass side of the toroidal cavity 35 is disposed in the same manner as the braking magnet 30 of FIG. 7. The central core 40 may be arranged to be rotated with the rotating magnetic field or to be stationary. The rotating magnetic field is generated by the stationary annular magnet 34 in the same manner as the rotating magnetic field created by the plurality of stationary electric coils in an alternating current electric motor. The magnetic poles included in the rotating magnet or stationary magnet generating a rotating field may be non-shaded poles or shaded poles.

In FIG. 9, there is illustrated an end view of a central core such as the item 28 of FIG. 7 or item 40 of FIG. 8. The central core 43 may be a solid cylinder of carbon steel with a central hole or a stack of a plurality of annular wafers of carbon steel.

In FIG. 10, there is shown an end view of another central core 45 with a centrally located hole 46. The central core may be a solid hollow cylinder of carbon steel with a plurality of radial slits 47 or a stack of a plurality of annular wafers of carbon steel with multiple radial slits.

In FIG. 11, there is illustrated a cross section of a ball bearing flow meter constructed in accordance with the principles of the present invention. The ball bearing flow meter comprises a plurality of the spherical balls 48 orbitably entrained in series within a toroidal cavity 49 wherein the toroidal cavity 49 has a circular cross section with a diameter slightly greater than the diameter of the spherical balls 48. The toroidal cavity 49 is divided into two segments by the openings 50 and 51 of the ports 52 and 53 merging into the toroidal cavity; the first segment 54 of the toroidal cavity 49 connects the two ports 52 and 53 to one another in a tangential arrangement and provides the flow passage from one port 52 to the other port 53, while the second segment 55 of the toroidal cavity 49 provides the return-pass for the spherical balls. The pot openings 50 and 51 are provided with the guides 56 and 57, respectively. The construction and purpose of these guides are described in conjunction with FIG. 2. The sensor 58 sensing each of the spherical balls passing by provides the information that is calibrated into the volume rate or mass rate of the flow. It should be understood that there is little leak of fluid across each of the spherical balls as the gap between the surface of the spherical balls and the wall of the toroidal cavity is very small and the pressure difference across each of the spherical balls is maintained at a low value. Therefore, the fluid cannot flow through the ball bearing flow meter without orbiting the spherical balls.

Figure 12:
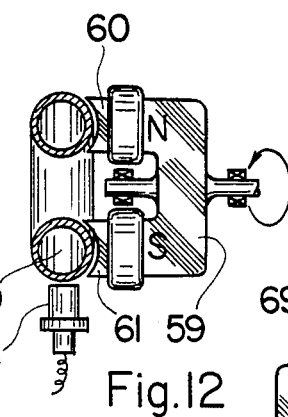
FIG. 12 illustrates another cross section of the ball bearing flow meter of FIG. 11 taken along a plane 12—12 as shown in FIG. 11.

In FIG. 12, there is shown another cross section of the ball bearing flow meter of FIG. 11 taken along a plane 12—12 as shown in FIG. 11. A rotating magnet 59 with multiple poles 60, 61, etc., disposed adjacent to the toroidal cavity 49 in a coaxial relationship generates a rotating magnetic field with the magnetic flux traversing across the toroidal cavity 49. The rotating magnetic field generates an orbiting motion of the spherical balls following the toroidal cavity. The construction of the spherical balls 48 are described in conjunction with the description of the operating principles of the ball bearing pump.

The direction of the rotating magnetic field must be selected in such a way that the spherical balls orbit from the inlet port opening to the outlet port opening in the flow passage segment of the toroidal cavity and from the outlet port opening to the inlet port opening in the return-pass segment of the toroidal cavity. The spherical balls experience an acceleration in the vicinity of the inlet port opening because the rotating magnetic field and the fluid pressure gradient collaborates to orbit the spherical balls in the flow passage segment of the toroidal cavity and, consequently, the distance between adjacent pairs of the spherical balls increases in the vicinity of the inlet port opening as the fluid moves into the gap between the spherical balls in the toroidal cavity through the inlet port. The spherical balls experience a deceleration in the vicinity of the outlet port opening because the rotating magnetic field and the fluid pressure gradient oppose each other in the return-pass segment of the toroidal cavity and, consequently, the distance between adjacent pairs of the spherical balls decreases in the vicinity of the outlet port opening as the fluid occupying the gap between the spherical balls in the toroidal cavity is emptied into the outlet port. As a matter of fact, in order to make a ball bearing flow meter work, it is sufficient to have a magnetic field on the return-pass half of the toroidal cavity that returns the spherical balls from the outlet side with a lower fluid pressure to the inlet side with a higher fluid pressure. It should be understood that, in most industrial applications, flow meters are used in conjunction with flow control valves controlling the flow rate. The ball bearing flow meter of the present invention can provide a dual role as a flow meter and as a flow control means when a rotating magnetic field with a variable rpm is employed in generating the orbiting motion of the spherical balls.

Figure 13:
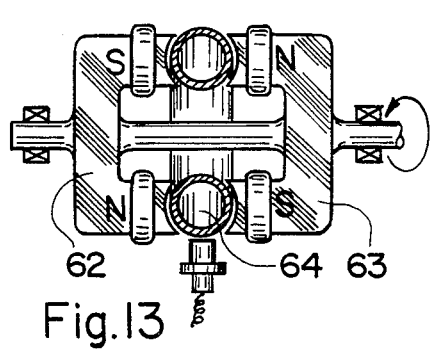
FIG. 13 illustrates a cross section of another embodiment of the ball bearing flow meter taken along the same plane as that of FIG. 12.

In FIG. 13, there is shown a cross section of another embodiment of the ball bearing flow meter taken along the same plane as that of FIG. 12. The toroidal cavity 64 of a ball bearing flow meter is sandwiched between a pair of rotating magnets with multiple poles 62 and 63 in a coaxial arrangement. This arrangement of a pair of rotating magnets disposed in a mirror image to one another provides more and stronger orbiting force on the spherical balls compared with the single rotating magnet of FIG. 12.

Figure 14:
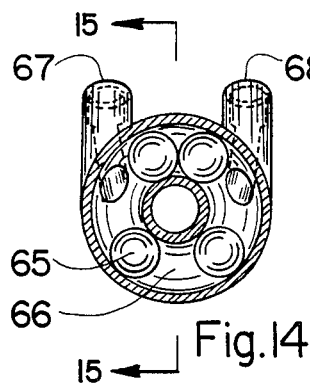
FIG. 14 illustrates a cross section of a further embodiment of the ball bearing flow meter.

In FIG. 14, there is illustrated a cross section of another arrangement of the ball bearing flow meter including a plurality of spherical balls entrained in a toroidal cavity or closed loop cavity 66. The pair of ports 67 and 68 are extending out from the toroidal cavity 66 from the side of the toroidal cavity, which arrangement provides a clear outer circumference of the toroidal cavity.

Figure 15:
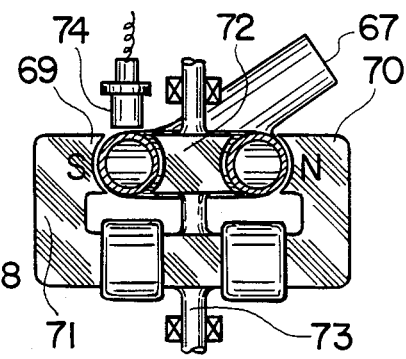
FIG. 15 illustrates another cross section of the ball bearing flow meter of FIG. 14 taken along a plane 15—15 as shown in FIG. 14.

In FIG. 15, there is illustrated another cross section of the ball bearing flow meter of FIG. 14 taken along a plane 15—15 as shown in FIG. 14. The multiple poles 69, 70, etc., of the rotating magnet 71 are disposed adjacent to the outer circumference of the toroidal cavity wall. The central core 72 is rotatably disposed within the inner circumference of the toroidal cavity wall and rigidly connected to the rotating magnet 71 by means of a shaft 73 made of magnetically nonreacting material. The sensor 74 sensing the spherical balls passing by is installed on the side of the toroidal cavity.

Figure 16:
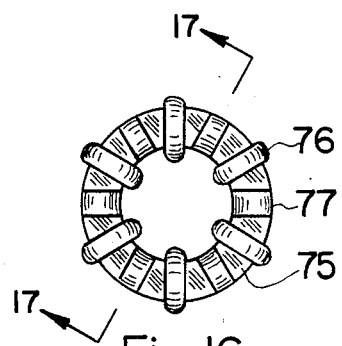
FIG. 16 illustrates an end view of a stationary magnet with toroidal core employed to create a rotating magnetic field.

In FIG. 16, there is shown an end view of a stationary annular magnet that generates a rotating magnetic field when it is connected to a three phase alternating electric current. This stationary annular magnet includes an annular core 75, a plurality of the electric coils 76 wound around the annular core 75 and a plurality of poles 77 extending from one side of the annular core 75.

Figure 17:
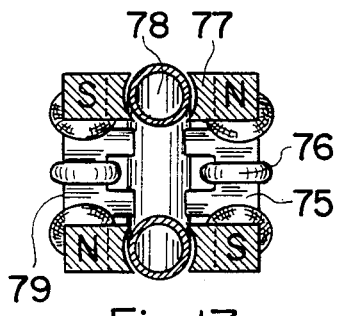
FIG. 17 illustrates a cross section of a pair of magnets with the toroidal core sandwiching the toroidal cavity of a ball flow meter in mirror image to one another.

In FIG. 17, there is illustrated another cross section of the stationary annular magnet of FIG. 16 taken along a plane 17—17 as shown in FIG. 16, which is installed adjacent to a toroidal cavity 78 in conjunction with another stationary annular magnet disposed in a mirror image to one another wherein the toroidal cavity 78 of a ball bearing flow meter is sandwiched therebetween.

Figure 18:
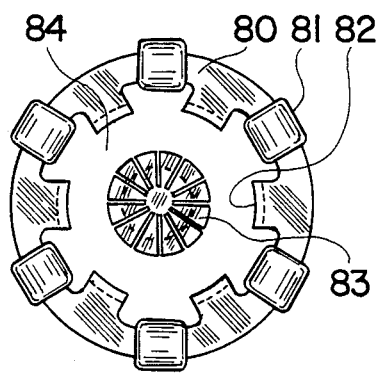
FIG. 18 illustrates an end view of a coaxial arrangement of a stationary magnet with an annular core and a central core providing an annular gap to receive the toroidal cavity of a ball bearing flow meter.

In FIG. 18, there is illustrated an end view of another stationary annular magnet that generates a rotating magnetic field when it is connected to a three phase alternating electric current. This stationary annular magnet includes an annular core 80, a plurality of electric coils 81 wound around the annular core 80 and a plurality of the poles 82 extending inwardly from the annular core 80. A central core 83 having a solid cylindrical geometry with a plurality of radial slits is disposed within the stationary annular magnet on the same plane, which arrangement provides an annular space 84 for installing the toroidal cavity of a ball bearing flow meter. The stationary annular magnets shown in FIGS. 16 and 18 generates a rotating magnetic field on the same principle as a rotating magnetic field is generated in a three phase alternating current electric motor.

Figure 19:
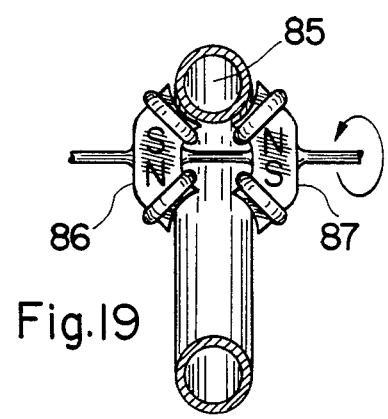
FIG. 19 illustrates a cross section of a ball bearing flow meter wherein the axis of rotation of the rotating magnets is off-set from the axis of axisymmetry of the toroidal cavity of the flow meter.

In FIG. 19, there is shown a cross section of a ball bearing flow meter including a toroidal cavity 85 sandwiched between a pair of rotating magnets 86 and 87 disposed in a mirror image to one another within the loop of the toroidal cavity. The axis of rotation of the rotating magnets 86 and 87 is off set from the axis of axisymmetry of the toroidal cavity 85, wherein the rotating magnetic field created by the pair of rotating magnets 86 and 87 effects the spherical balls only when they are located in the return-pass segment of the toroidal cavity 85. It is not difficult to imagine that a pair of rotating magnets having the same arrangement as that shown in FIG. 19 with a diameter matched to the inside circumference of the toroidal cavity wall can be installed in a coaxial arrangement.

Figure 20:
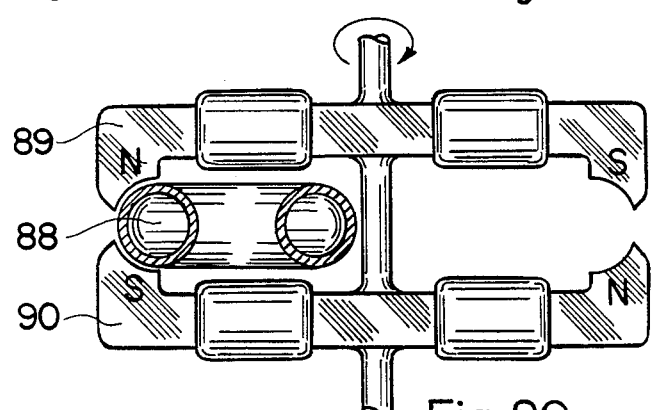
FIG. 20 illustrates a cross section of another ball bearing flow meter wherein the axis of rotation of the rotating magnets is off-set from the axis of axisymmetry of the toroidal cavity of the flow meter.

In FIG. 20, there is shown a cross section of a ball bearing flow meter including a toroidal cavity sandwiched between a pair of the rotating magnets 89 and 90 disposed in a mirror image to one another wherein the toroidal cavity 88 has a diameter smaller than the diameter of the rotating magnets.

It should be understood that the ball bearing pump can always be used as a flow meter and, consequently, the ball bearing pump is a positive displacement pump and a positive displacement flow meter, while the ball bearing flow meter is only a positive displacement flow meter. It should be further understood that the different configurations for the arrangement of the rotating magnets and the stationary magnets in conjunction with the toroidal cavity of a flow meter or a pump are interchangeable between the rotating magnets and the stationary magnets. For example a pair of stationary magnets similar to that shown in FIG. 16 can be installed in the same configuration as the pair of rotating magnets shown in FIG. 19.

While the principles of the present invention have now been made clear by the illustrative embodiments, the utilization of the present invention shall not be limited to such illustrative embodiments as it will be immediately obvious to the skilled in the art that they may make many modifications of the structure, arrangements, elements, proportions and materials which are particularly adapted to the specific working environment and operating condition in practicing the the invention without departing from the principles of the present invention.

We claim:

1. A ball bearing pump-flow meter comprising in combination:
   (a) a closed loop cavity having a circular cross section;
   (b) a first port merging into said closed loop cavity;
   (c) a second port merging into said closed loop cavity wherein said first and second ports merging into said closed loop cavity divides said closed loop cavity into a flow passage segment and a return-pass segment;
   (d) a plurality of spherical balls having a diameter slightly smaller than the diameter of said circular cross section of said closed loop cavity, said plurality of spherical balls orbitably entrained in said closed loop cavity;
   (e) a rotating magnetic field rotating about an axis substantially perpendicular to a plane including said closed loop cavity, wherein said rotating magnetic field produces a force on said plurality of spherical balls substantially tangential to said closed loop cavity in a direction from said first port to said second port in said flow passage segment of said closed loop cavity and in a direction from said second port to said first port in said return pass segment of said closed loop cavity, said force generating an orbiting movement of said plurality of spherical balls in a direction from said first port to said second port in said flow passage segment of said closed loop cavity and in a direction from said second port to said first port in said return-pass segment of said closed loop cavity;
   (f) a stationary braking magnetic field included in said return-pass segment of said closed loop cavity adjacent to said second port, wherein said stationary braking magnetic field provides a force acting in a general direction from said first port to said second port in said return-pass segment of said closed loop cavity and provides a braking on said orbiting movement of said plurality of spherical balls moving from said second port to said first port in said return-pass segment of said closed loop cavity;

wherein said plurality of spherical balls under an acceleration in a vicinity of said first port draw the fluid from said first port into said flow passage segment of said closed loop cavity and said plurality of spherical balls under a deceleration in a vicinity of said second port force out the fluid from said flow passage segment of said closed loop cavity into said second port.

2. The combination as set forth in claim 1 wherein means for measuring the frequency of said plurality of spherical balls orbiting in said closed loop cavity is included; whereby, information from said means is calibrated to a rate of flow.

3. The combination as set forth in claim 1 wherein means for varying the rate of rotation of said rotating magnetic field is included; whereby, the rate of flow through said ball bearing pump-flow meter is controllable by said means for varying the rate of rotation of said rotating magnetic field.

4. The combination as set forth in claim 2 wherein means for varying the rate of rotation of said rotating magnetic field is included; whereby, the rate of flow through said ball bearing pump-flow meter is controllable by said means for varying the rate of rotation of said rotating magnetic field.

5. A ball bearing flow meter-flow controller comprising in combination:
   (a) a closed loop cavity having a circular cross section;
   (b) a first port merging into said closed loop cavity;
   (c) a second port merging into said closed loop cavity wherein said first and second ports merging into said closed loop cavity divides said closed loop cavity into a flow passage segment and a return-pass segment;
   (d) a plurality of spherical balls having a diameter slightly smaller than the diameter of said circular cross section of said closed loop cavity, said plurality of spherical balls orbitably entrained in said closed loop cavity;
   (e) a rotating magnetic field rotating about an axis substantially perpendicular to a plane including said closed loop cavity, wherein said rotating magnetic field produces a force on said plurality of spherical balls substantially tangential to said closed loop cavity in a direction from said first port to said second port in said flow passage segment of said closed loop cavity and in a direction from said second port to said first port in said return pass segment of said closed loop cavity, said force generating an orbiting movement of said plurality of spherical balls in a direction from said first port to said second port in said flow passage segment of said closed loop cavity and in a direction from said second port to said first port in said return-pass segment of said closed loop cavity;

whereby, said plurality of spherical balls under an acceleration in a vicinity of said first port draw the fluid from said first port into said flow passage segment of said closed loop cavity and said plurality of spherical balls under a deceleration in a vicinity of said second port force out the fluid from said flow passage segment of said closed loop cavity into said second port.

6. The combination as set forth in claim 5 wherein means for measuring the frequency of said plurality of spherical balls orbiting in said closed loop cavity is included; whereby, information from said means is calibrated to a rate of flow.

7. The combination as set forth in claim 5 wherein means for varying the rate of rotation of said rotating magnetic field is included; whereby, the rate of flow through said ball bearing flow meter-flow controller is controllable by said means for varying the rate of rotation of said rotating magnetic field.

8. The combination as set forth in claim 6 wherein means for varying the rate of rotation of said rotating magnetic field is included; ;whereby, the rate of flow through said ball bearing flow meter-flow controller is controllable by said means for varying the rate of rotation of said rotating magnetic field.

* * * * *